United States Patent
Gatti

(10) Patent No.: US 10,110,628 B2
(45) Date of Patent: Oct. 23, 2018

(54) PHISHING SOURCE TOOL

(71) Applicant: Bank of America Corporation, Charlotte, NC (US)

(72) Inventor: Benjamin L. Gatti, Lake Park, NC (US)

(73) Assignee: Bank of America Corporation, Charlotte, NC (US)

( * ) Notice: Subject to any disclaimer, the term of this patent is extended or adjusted under 35 U.S.C. 154(b) by 234 days.

(21) Appl. No.: 14/805,701

(22) Filed: Jul. 22, 2015

(65) Prior Publication Data

US 2017/0026411 A1    Jan. 26, 2017

(51) Int. Cl.
*H04L 29/06*      (2006.01)
*H04L 12/58*      (2006.01)

(52) U.S. Cl.
CPC .......... *H04L 63/1483* (2013.01); *H04L 51/12* (2013.01); *H04L 63/1433* (2013.01); *H04L 63/1441* (2013.01)

(58) Field of Classification Search
CPC ............. H04L 63/1433; H04L 63/1441; H04L 63/1483; H04L 51/12
See application file for complete search history.

(56) References Cited

U.S. PATENT DOCUMENTS

| | | |
|---|---|---|
| 7,356,564 B2 | 4/2008 | Hartsllc et al. |
| 7,499,976 B2 | 3/2009 | Cato |
| 7,603,718 B2 | 10/2009 | Rounthwaite et al. |
| 7,908,328 B1 | 3/2011 | Hulten et al. |
| 7,925,883 B2 | 4/2011 | Florencio et al. |
| 7,930,289 B2 | 4/2011 | Cheshire |
| 8,041,769 B2 | 10/2011 | Shraim et al. |
| 8,255,468 B2 | 8/2012 | Vitaldevara et al. |
| 8,352,318 B2 | 1/2013 | Rikhtverchik et al. |
| 8,381,292 B1 | 2/2013 | Warner et al. |
| 8,484,741 B1 | 7/2013 | Chapman |
| 8,615,807 B1 | 12/2013 | Higbee et al. |
| 8,621,614 B2 | 12/2013 | Vaithilingam et al. |
| 8,635,666 B2 | 1/2014 | Curnyn |
| 8,635,703 B1 | 1/2014 | Belani et al. |
| 8,640,231 B2 | 1/2014 | Florencio et al. |
| 8,689,341 B1 | 4/2014 | Hartmann et al. |
| 8,695,100 B1 | 4/2014 | Cosoi |
| 8,719,940 B1 | 5/2014 | Higbee et al. |
| 8,793,799 B2 | 7/2014 | Fritzson et al. |
| 8,910,287 B1 | 12/2014 | Belani et al. |
| 8,966,637 B2 | 2/2015 | Belani et al. |
| 9,027,126 B2 | 5/2015 | Larkins |
| 2012/0046937 A1 | 2/2012 | Ocke et al. |
| 2013/0297375 A1 | 11/2013 | Chapman |
| 2014/0337995 A1 | 11/2014 | Fritzson et al. |
| 2015/0012351 A1 | 1/2015 | Harding |

*Primary Examiner* — Carl G Colin
*Assistant Examiner* — Gary E Lavelle
(74) *Attorney, Agent, or Firm* — Michael A. Springs

(57) ABSTRACT

According to one embodiment, an apparatus includes a memory and a processor. The processor is configured to receive a forwarded email and to determine a plurality of keywords in the forwarded email. The processor is further configured to search an email server using the plurality of keywords and to determine that an email message from the plurality of email messages is the original email corresponding to the forwarded email. The processor is also configured to attach a portion of the determined email message to the forwarded email.

12 Claims, 3 Drawing Sheets

PHISHING SOURCE TOOL

TECHNICAL FIELD

This disclosure relates generally to a system for handling phishing emails.

BACKGROUND

Phishing emails and phishing campaigns place computing systems and networks at risk.

SUMMARY OF THE DISCLOSURE

According to one embodiment, an apparatus includes a memory and a processor. The processor is configured to receive a forwarded email and to determine a plurality of keywords in the forwarded email. The processor is further configured to search an email server using the plurality of keywords and to determine that an email message from the plurality of email messages is the original email corresponding to the forwarded email. The processor is also configured to attach a portion of the determined email message to the forwarded email.

According to another embodiment, a method includes receiving a forwarded email and determining, by a processor, a plurality of keywords in the forwarded email. The method further includes searching an email server using the plurality of keywords and receiving, in response to the search, a plurality of email messages. The method also includes determining, by the processor, that an email message from the plurality of email messages is the original email corresponding to the forwarded email and attaching a portion of the determined email message to the forwarded email.

According to yet another embodiment, a system includes a mail server configured to perform a search based on keywords and a phishing management device communicatively coupled to the mail server. The phishing management device is configured to receive a forwarded email and to determine a plurality of keywords in the forwarded email. The phishing management device is further configured to search the email server using the plurality of keywords and to receive, in response to the search, a plurality of email messages. The phishing management device is also configured to determine that an email message from the plurality of email messages is the original email corresponding to the forwarded email and to attach a portion of the determined email message to the forwarded email.

Certain embodiments may provide one or more technical advantages. For example, an embodiment may reduce the chances of spreading a phishing email. As another example, an embodiment may reduce the effectiveness of phishing emails. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
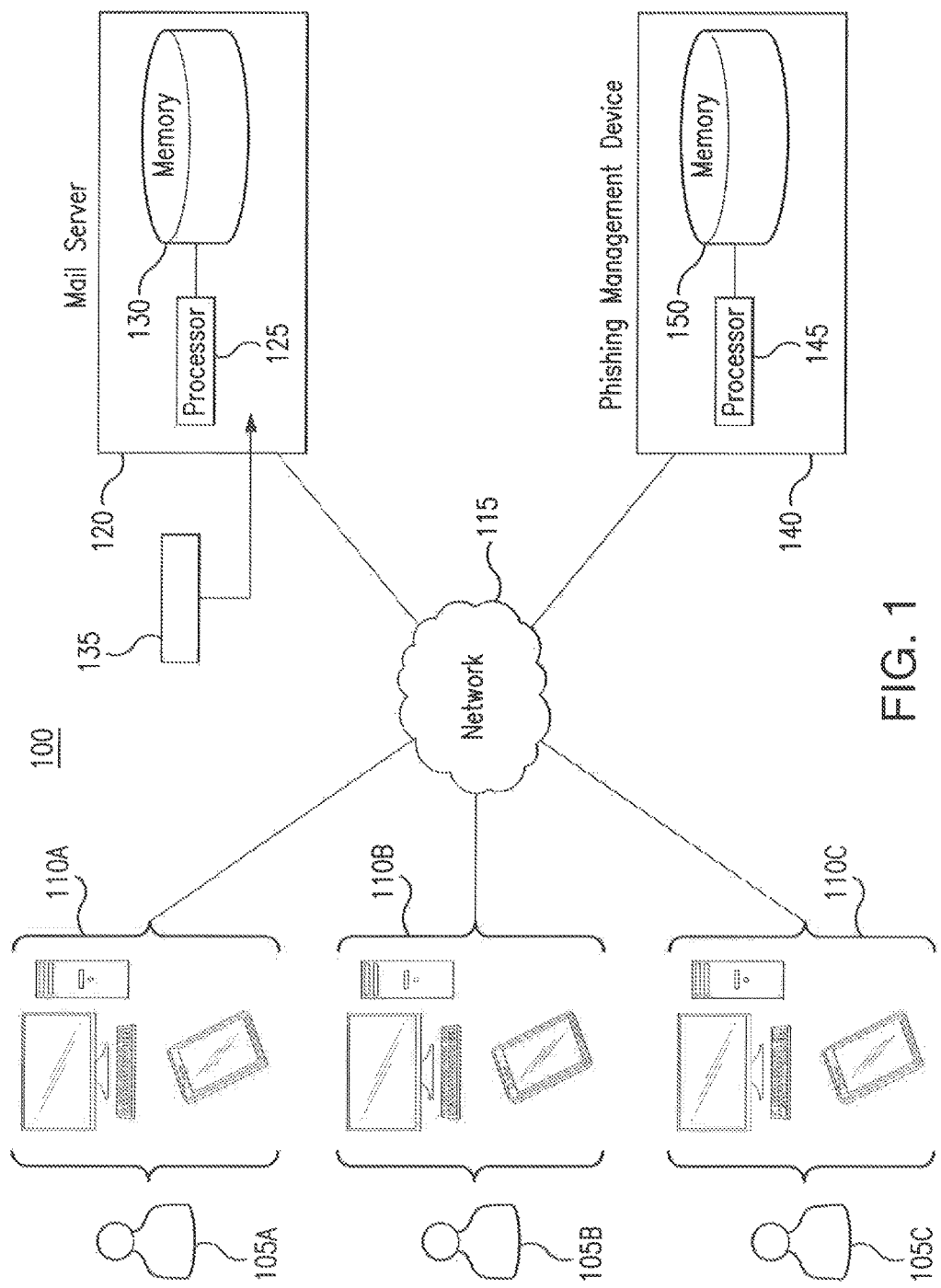
FIG. 1 illustrates a system for handling phishing emails.
Figure 2:
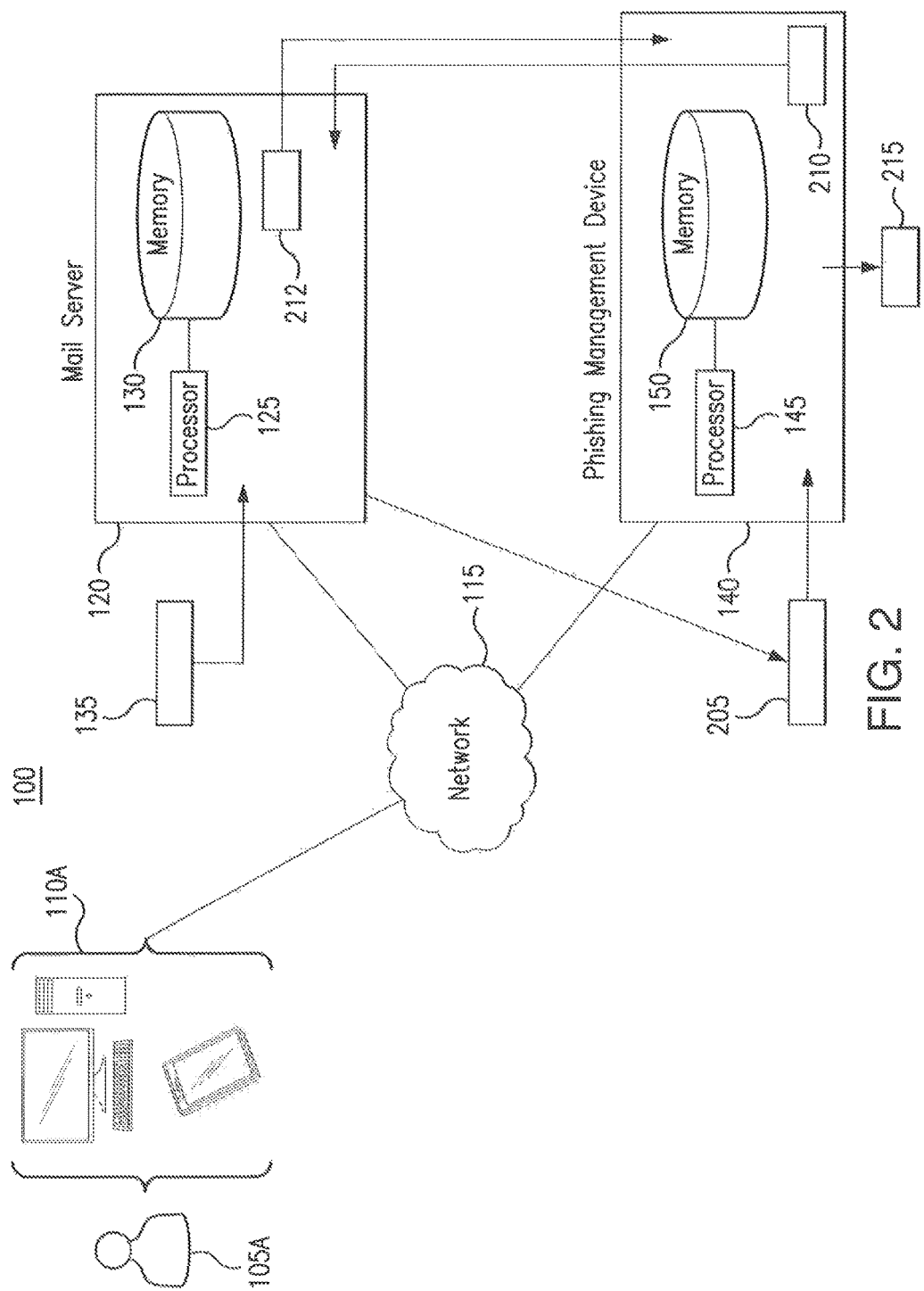
FIG. 2 illustrates reporting a phishing email using the system of FIG. 1.
Figure 3:
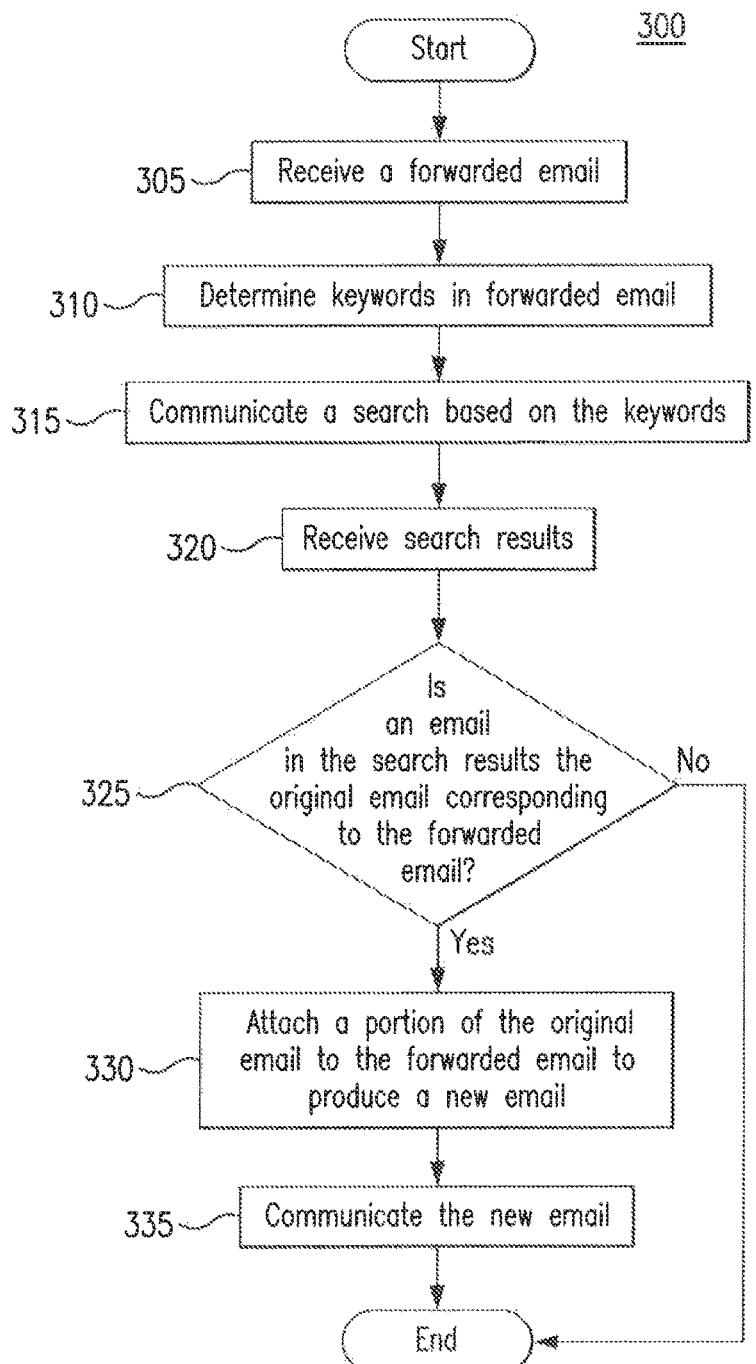
FIG. 3 is a flowchart illustrating a method of reporting a phishing email using the system of FIG. 1.

Embodiments of the present disclosure and its advantages are best understood by referring to FIGS. 1 through 3 of the drawings, like numerals being used for like and corresponding parts of the various drawings.

Phishing scams place computing systems and networks at substantial risk. Phishing typically involves the sending of emails and/or messages that attempt to deceive the recipient into providing personally identifiable information, passwords, and any other information that, when known by an unauthorized party, may threaten the security of the system and/or network. Phishing may also involve sending emails and/or messages that deceive the recipient into installing viruses and/or worms onto the recipient's device. Because the success of a phishing scam may depend on the response of only one recipient and because the number of recipients may be large, it may be difficult to prevent a phishing scam from jeopardizing the security of a system and/or network. For example, if a phishing email is sent to one thousand users on a network it may be difficult to ensure that all one thousand users do not fall victim to the phishing email.

This disclosure provides a system that may reduce the effectiveness of phishing scams. The system may determine the original source of a reported phishing email by searching a mail server. In certain embodiments, by using this system, various technical advantages may be realized. For example, in one embodiment using the system may reduce the chances of spreading a phishing email. As another example, in another embodiment the system may prevent future phishing emails from a source. The system will be described generally using FIG. 1. The various functions performed by the system will be described in more detail using FIGS. 2 and 3. Although this disclosure primarily describes phishing within the context of email, this disclosure contemplates phishing scams within any messaging context including text messaging, chat messaging, and/or any other appropriate messaging scheme.

FIG. 1 illustrates a system 100 for handling phishing emails. As provided in FIG. 1, system 100 includes users 105A, 105B and 105C, devices 110A, 110B, and 110C, network 115, mail server 120, and phishing management device 140. The components of system 100 may be communicatively coupled to each other through network 115. For ease of illustration, the number of illustrated components of system 100 is limited, but this disclosure contemplates system 100 including any number of users 105, devices 110, networks 115, mail servers 120, and phishing management devices 140.

A user 105 may use device 110 to perform various functions related to email. For example, user 105 may use device 110 to compose email, read email, reply and/or forward email, and/or delete email. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 may facilitate communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Mail server 120 may handle the email traffic of system 100. As provided in FIG. 1, mail server 120 may include a processor 125 and a memory 130. Processor 125 and memory 130 may be communicatively coupled to each other. This disclosure contemplates processor 125 and memory 130 being configured to perform any of the functions of mail server 120 described herein. For example, processor 125 and memory 130 may be configured to receive email and/or store email.

Processor 125 may execute software stored on memory 130 to perform any of the functions described herein. Processor 125 may control the operation and administration of mail server 120 by processing information received from network 115, device 110, and memory 130. Processor 125 may include any hardware and/or software that operates to control and process information. Processor 125 may be a programmable logic device, a microcontroller, a microprocessor, any suitable processing device, or any suitable combination of the preceding.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Mail server 120 may manage the email traffic of system 100. For example, mail server 120 may receive an email 135. Mail server 120 may then determine which user 105 is the intended recipient of email 135. Mail server 120 may then deliver email 135 to the appropriate device 110. Mail server 120 may also store email 135. When a user 105 uses device 110 to reply, forward, and/or delete email 135, mail server 120 may receive a command from the device 110. Mail server 120 may then respond appropriately to the command.

Phishing management device 140 may track and/or handle phishing emails received by system 100. As provided in FIG. 1, phishing management device 140 includes a processor 145 and a memory 150. This disclosure contemplates processor 145 and memory 150 being configured to perform any of the functions of phishing management device 140 described herein. Processor 145 may be communicatively coupled to memory 140.

Processor 145 may execute software stored on memory 150 to perform any of the functions described herein. Processor 145 may control the operation and administration of phishing management device 140 by processing information received from network 115, device 110, and memory 150. Processor 145 may include any hardware and/or software that operates to control and process information. Processor 145 may be a programmable logic device, a microcontroller, a microprocessor, any suitable processing device, or any suitable combination of the preceding.

Memory 150 may store, either permanently or temporarily, data, operational software, or other information for processor 145. Memory 150 may include any one or a combination of volatile or non-volatile local or remote devices suitable for storing information. For example, memory 150 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 150, a disk, a CD, or a flash drive. In particular embodiments, the software may include an application executable by processor 145 to perform one or more of the functions described herein.

In certain embodiments, system 100 may reduce the effectiveness of a phishing scam. For example, system 100 may allow a phishing email to be reported. When a phishing email is reported, system 100 may perform a search to identify the source of the phishing email. An administrator may then restrict and/or block future emails from that source. Reporting a phishing email is discussed in more detail using FIGS. 2 and 3.

FIGS. 2 and 3 illustrate reporting a phishing email using the system 100 of FIG. 1. When a user receives a phishing email, the user may report the phishing email to an administrator of system 100 so that the administrator can handle the phishing email systemwide. Typically, to report the phishing email, the user may forward the received phishing email to the administrator. However, forwarded emails typically do not contain an Internet header of the original email. As a result, it may become difficult for the administrator to determine the source of the original email corresponding to the forwarded email. For example, without knowing the source, the administrator may not be able to determine whether the email is a phishing email. As another example, without knowing the source, the administrator may not be able to block future emails from that source.

System 100 may allow a user to report a phishing email by forwarding the email to the phishing management device 140. Phishing management device 140 may then identify keywords in the email and perform a search based on those keywords. Then, based on the search results, phishing management device 140 may identify the original email corresponding to the forwarded email based on the search results. Phishing management device 140 may then append, attach, link, and/or reference a portion of the original email to the forwarded email for the administrator to analyze. As a result, the administrator may be able to analyze an Internet header of the original email corresponding to the forwarded email.

FIG. 2 illustrates reporting a phishing email using the system 100 of FIG. 1. When a phishing email is reported, system 100 may perform a search to determine the original source of the phishing email. In particular embodiments, by reporting phishing emails using system 100 an administrator may be able to identify the original source of a phishing email. For clarity, certain elements of system 100 have not been illustrated in FIG. 2, but their omission should not be construed as their elimination from system 100.

User 105A may receive an email 135 that user 105A suspects is a phishing email. In particular embodiments and as illustrated in FIG. 2, email 135 may be received by mail server 120. After mail server 120 receives email 135, mail server 120 may communicate email 135 to device 110A. In other embodiments, device 110A may request new emails from mail server 120, and in response, mail server 120 may communicate email 135 to device 110A. User 105A may read email 135 on device 110A and suspect that email 135 is a phishing email.

User 105A may report that email 135 is a phishing email by forwarding email 135 to phishing management device 140. In particular embodiments, phishing management device 140 may be associated with an email address to which user 105A may forward email 135. When user 105A forwards email 135, mail server 120 may generate an email 205 and forward email 205 to phishing management device 140. This disclosure contemplates device 110 generating and forwarding email 205. However, forwarded email 205 may not include the Internet header of email 135. As a result, if an administrator reviews forwarded email 205, the administrator may not be able to determine the original source of email 135.

In particular embodiments, forwarded email 205 may include an attachment. In this instance, phishing management device 140 may extract text from the attachment and add the extracted text into forwarded email 205. In this manner, if a phishing scam involves deceiving a recipient to open an attachment containing a worm or a virus, then the administrator may be able to review the substance of the attachment without opening the attachment.

When phishing management device 140 receives forwarded email 205, phishing management device 140 may analyze the text of forwarded email 205 and determine keywords for forwarded email 205. Using these keywords, phishing management device 140 may then generate a search request 210. For example, if forwarded email 205 concerns recovering a password for a bank account, phishing management device 140 may determine that forwarded email 205 is associated with the keywords "bank" and "password." Phishing management device 140 may then generate search request 210 using the words "bank" and "password."

In particular embodiments, phishing management device 140 may determine the keywords based on the subject of forwarded email 205. Using the previous example, forwarded email 205 may include the subject "password recovery for bank account." Phishing management device 140 may review the subject and determine the keywords are "bank" and "password." Phishing management device 140 may then generate search request 210 based on these determined keywords.

Phishing management device 140 may communicate search request 210 to mail server 120 in order to perform the search. After performing the search, mail server 120 may return a plurality of results 212. Results 212 may include email 135. Mail server 120 may then communicate results 212 to phishing management device 140. Phishing management device 140 may then analyze results 212 to determine the original email corresponding to forwarded email 205. Using the previous example, mail server 120 may return five emails that contain the keywords "bank" and "password." Phishing management device 140 may review these five emails to determine the original email corresponding to forwarded email 205.

In particular embodiments, mail server 210 may limit the search to a mailbox of a sender of forwarded email 205. Using the example of FIG. 2, mail server 120 may receive search request 210 and limit the search to a mailbox of user 105A. In this manner, mail server 120 may perform a targeted search that does not waste processing resources by searching a mailbox of every user.

After phishing management device 140 determines that email 135 corresponds to forwarded email 205, phishing management device 140 may retrieve the Internet header from email 135 and attach, append, link, and/or reference the Internet header to forwarded email 205 to generate new email 215. Phishing management device 140 may then communicate new email 215 so that an administrator may review new email 215 to determine whether forwarded email 205 is a phishing email and/or determine the original source of forwarded email 205. In particular embodiments, phishing management device 140 may be able to determine the original source of email 135 based on the Internet header. Phishing management device 140 may identify the original source to an administrator. Furthermore, the administrator may be able to block the original source of forwarded email 205.

FIG. 3 is a flowchart illustrating a method 300 of reporting a phishing email using the system 100 of FIG. 1. In particular embodiments, phishing management device 140 may perform method 300. Phishing management device 140 may begin by receiving a forwarded email in step 305. The forwarded email may be suspected of being a phishing email. In step 310, phishing management device 140 may determine keywords in the forwarded email. Phishing management device 140 may then communicate a search based on the determined keywords in step 315. In particular embodiments, phishing management device 140 may communicate the search to mail server 120.

Phishing management device 140 may receive search results in step 320. In step 325, phishing management device 140 may determine whether an email in the search results is the original email corresponding to the forwarded email. If none of the emails in the search results is the original email corresponding to the forwarded email, phishing management device 140 may conclude. If an email in the search results is the original email corresponding to the forwarded email, phishing management device 140 may proceed to attach a portion of the original email to the forwarded email to produce a new email in step 330. In particular embodiments, the attached portion may include the Internet header of the original email. In step 335, phishing management device 140 may communicate the new email. In particular embodiments, phishing management device 140 may communicate the new email to an administrator.

In certain embodiments, by performing method 300, phishing management device 140 may determine the original source of a suspected phishing email. As a result, an administrator may be able to block the original source from sending any further phishing emails.

Modifications, additions, or omissions may be made to method 300 depicted in FIG. 3. Method 300 may include more, fewer, or other steps. For example, steps may be performed in parallel or in any suitable order. While discussed as phishing management device 140 performing the steps, any suitable component of system 100, such as device 110 and/or mail server 120 for example, may perform one or more steps of the method.

This disclosure contemplates users 105A, 105B and 105C responding to phishing emails in any appropriate manner. For example, users 105A, 1051 and 105C may respond to a phishing email by clicking a link in the phishing email. As another example, users 105A, 105B and 105C may respond to a phishing email by replying to it. As another example, users 105A, 105B and 105C may respond to a phishing email by opening an attachment in the phishing email. As further examples, users 105A, 105B, and 105C may respond by forwarding the phishing email, deleting the phishing email, opening the phishing email, opening the phishing email, reading the phishing email, opening an attachment in the phishing email, calling a phone number in the phishing email, and/or reporting the phishing email.

Modifications, additions, or omissions may be made to system 100 without departing from the scope of the invention. For example, phishing management device 14 may be a distributed system. As another example, the components of system 100 may be integrated or separated. For example, mail server 120 may be incorporated into phishing management device 140, and vice versa.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory; and
   a processor communicatively coupled to the memory, the processor configured to:
      receive a forwarded email comprising an attachment;
      determine a plurality of keywords in the forwarded email;
      search an email server using the plurality of keywords, wherein the search of the email server is limited to the mailbox of a sender of the forwarded message;
      receive, in response to the search, a plurality of email messages;
      determine that an email message from the plurality of email messages is the original email corresponding to the forwarded email, the forwarded email comprising the determined email message but not an internet header of the determined email message;
      extract the internet header from the determined email message;
      extract text from the attachment; and
      attach the extracted text and the extracted internet header to the forwarded email.

2. The apparatus of claim 1, wherein the plurality of keywords are in the subject of the forwarded email message.

3. The apparatus of claim 1, wherein the processor is further configured to determine, based on the determined email message, a sender of the original email.

4. The apparatus of claim 1, wherein the original email is part of a phishing scam.

5. A method comprising:
   receiving a forwarded email comprising an attachment;
   determining, by a processor, a plurality of keywords in the forwarded email;
   searching an email server using the plurality of keywords, wherein the search of the email server is limited to the mailbox of a sender of the forwarded message;
   receiving, in response to the search, a plurality of email messages;
   determining, by the processor, that an email message from the plurality of email messages is the original email corresponding to the forwarded email, the forwarded email comprising the determined email message but not an internet header of the determined email message;
   extracting the internet header from the determined email message;
   extracting text from the attachment; and
   attaching the extracted text and the extracted internet header to the forwarded email.

6. The method of claim 5, wherein the plurality of keywords are in the subject of the forwarded email message.

7. The method of claim 5, further comprising determining, by the processor, based on the determined email message, a source of the original email.

8. The method of claim 5, wherein the original email is part of a phishing scam.

9. A system comprising:
   a mail server configured to perform a search based on keywords; and
   a phishing management device communicatively coupled to the mail server and configured to:
      receive a forwarded email comprising an attachment;
      determine a plurality of keywords in the forwarded email;
      search the email server using the plurality of keywords, wherein the search of the email server is limited to the mailbox of a sender of the forwarded message;
      receive, in response to the search, a plurality of email messages;
      determine that an email message from the plurality of email messages is the original email corresponding to the forwarded email, the forwarded email comprising the determined email message but not an internet header of the determined email message;
      extract the internet header from the determined email message;
      extract text from the attachment; and
      attach the extracted text and the extracted internet header to the forwarded email.

10. The system of claim 9, wherein the plurality of keywords are in the subject of the forwarded email message.

11. The system of claim 9, wherein the phishing management device is further configured to determine, based on the determined email message, a source of the original email.

12. The system of claim 9, wherein the original email is part of a phishing scam.

* * * * *